(12) United States Patent
Nackaerts et al.

(10) Patent No.: US 10,498,397 B1
(45) Date of Patent: Dec. 3, 2019

(54) WIRELESS DEVICE

(71) Applicant: NXP B.V., Eindhoven (NL)

(72) Inventors: Axel Nackaerts, Haasrode (BE);
Anthony Kerselaers, Herselt (BE);
Liesbeth Gommé, Anderlecht (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/404,891

(22) Filed: May 7, 2019

(51) Int. Cl.
*H04B 1/3827* (2015.01)
*H04B 5/00* (2006.01)

(52) U.S. Cl.
CPC ........... *H04B 5/0025* (2013.01); *H04B 1/385* (2013.01); *H04B 5/0081* (2013.01)

(58) Field of Classification Search
CPC ....... A01K 29/005; A61B 5/0024; A01L 1/00; A01L 7/00; G06K 19/0723
See application file for complete search history.

(56) References Cited

U.S. PATENT DOCUMENTS

| | | | |
|---|---|---|---|
| 7,467,603 B2 | 12/2008 | Davies | |
| 7,673,587 B2 | 3/2010 | Davies | |
| 8,166,923 B2 | 5/2012 | Davies | |
| 10,010,054 B1* | 7/2018 | Estes | A01K 15/027 |
| 2002/0030630 A1* | 3/2002 | Maeda | H01Q 1/273 343/702 |
| 2006/0000420 A1* | 1/2006 | Martin Davies | A01K 11/008 119/174 |
| 2011/0316693 A1* | 12/2011 | Loen | G08B 21/0219 340/539.13 |
| 2017/0213382 A1* | 7/2017 | Torvinen | A43B 3/0005 |
| 2017/0288731 A1* | 10/2017 | Kerselaers | H04B 5/0031 |
| 2017/0324170 A1* | 11/2017 | Kerselaers | H01Q 1/273 |

FOREIGN PATENT DOCUMENTS

GB 2482192 B 7/2014

* cited by examiner

*Primary Examiner* — David Bilodeau

(57) ABSTRACT

One example discloses a wireless device, comprising a near-field transceiver configured to be coupled to a host structure; a controller coupled to the transceiver; wherein the near-field transceiver includes a feed point configured to be coupled to a conductive surface; wherein the conductive surface is configured to be capacitively coupled to the host structure to form part of a near-field electric antenna; and wherein the conductive surface is configured to be in repeated, but not continuous, contact with a ground.

22 Claims, 7 Drawing Sheets

WIRELESS DEVICE

The present specification relates to systems, methods, apparatuses, devices, articles of manufacture and instructions for wireless communications.

SUMMARY

According to an example embodiment, a wireless device, comprising: a near-field transceiver configured to be coupled to a host structure; a controller coupled to the transceiver; wherein the near-field transceiver includes a feed point configured to be coupled to a conductive surface; wherein the conductive surface is configured to be capacitively coupled to the host structure to form part of a near-field electric antenna; and wherein the conductive surface is configured to be in repeated, but not continuous, contact with a ground.

In another example embodiment, the conductive surface is configured to be in repeated contact with the ground in response to the host structure walking, running, prancing rotating grasping, touching, and/or stopping then standing.

In another example embodiment, the ground is at least one of: earth ground, an assembly line, soil, a road, a trail, or a floor.

In another example embodiment, the conductive surface is a horseshoe.

In another example embodiment, the conductive surface is at least one of: a metal safety shoe, a robotic contact foot, a grasping device, and/or part of a vehicle's track structure.

In another example embodiment, the feed point is coupled to the conductive surface with a conductive via.

In another example embodiment, the conductive surface is a horseshoe; and the conductive via is at least one of: a nail, a spike, a bolt, or a clamp.

In another example embodiment, the host structure is a horse.

In another example embodiment, the host structure is at least one of: a person, a robot, livestock, an assembly line machine, or a vehicle track.

In another example embodiment, the wireless device is configured to communicate with another wireless device when the conductive surface is not in contact with the ground.

In another example embodiment, the wireless device is configured to enter a low-power state when the conductive surface of the wireless device is in contact with the ground.

In another example embodiment, the host structure is a horse; the conductive surface is a horseshoe; the horseshoe is coupled to a hoof of the horse; the ground is earth; the wireless device is configured to communicate with another wireless device when the hoof is not touching the earth; and the wireless device is configured to not communicate with another wireless device when the hoof is touching the earth.

In another example embodiment, the wireless device is a first wireless device; further comprising a second wireless device configured to be coupled to the host structure and having a near-field transceiver and a far-field transceiver; wherein the second wireless device is configured to receive a near-field electric signal from the near-field electric antenna of the first wireless device.

In another example embodiment, the second wireless device is spatially further from the ground than the first wireless device.

In another example embodiment, further comprising an intermediate structure configured to be coupled between the conductive surface and the host structure; and wherein the near-field transceiver and the controller are physically coupled to the intermediate structure.

In another example embodiment, the intermediate structure is a disposable pad.

In another example embodiment, the intermediate structure is a dielectric structure.

In another example embodiment, further comprising a sensor coupled to the controller; wherein the sensor is configured to detect when the conductive surface is in contact with the ground.

In another example embodiment, the sensor is configured to measure a physiological parameter of the host structure.

In another example embodiment, the sensor is at least one of an accelerometer, an infra-red proximity sensor, a pressure sensor, or a pressure plate.

In another example embodiment, further comprising a near-field magnetic antenna including a coil; wherein the coil is coupled to the near-field transceiver; and wherein together the coil and conductive surface function as a near-field electromagnetic induction (NFEMI) antenna.

According to an example embodiment, a method of making a wireless device, comprising: selecting an intermediate structure, a horseshoe, and a nail or screw; wherein the intermediate structure includes a near-field transceiver coupled to a controller; coupling the near-field transceiver to the horseshoe with the nail or screw; wherein, upon coupling, the horseshoe is capacitively coupled to the horse to form a near-field electric antenna.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
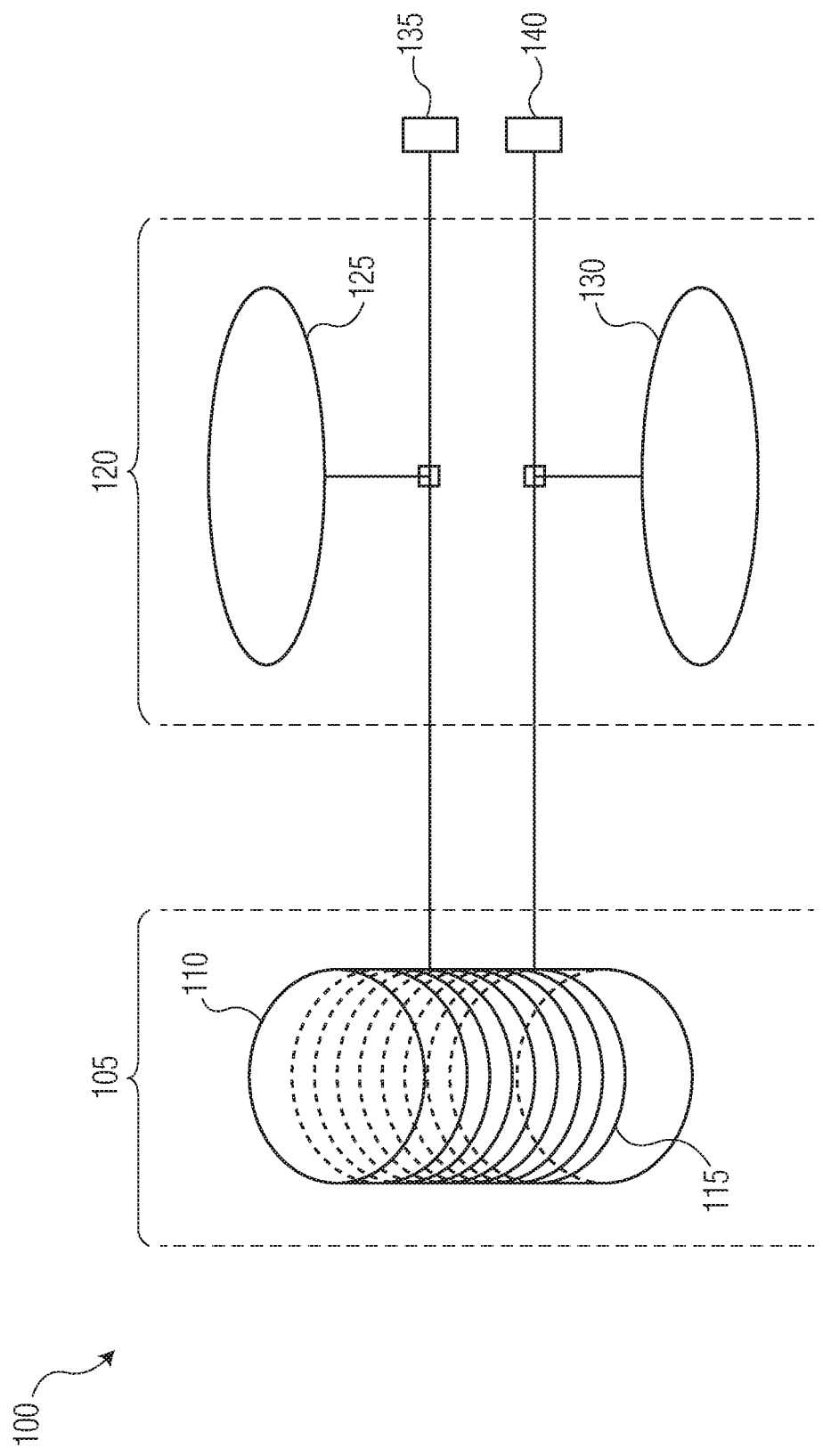
FIG. 1 is a first example idealized near-field electromagnetic induction (NFEMI) antenna.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed is both on-body communication using near-field communication, and off-body communications with other wireless networked devices (e.g. Internet of Things (IoT) devices) using far-field communications.

While far-field (e.g. RF) wireless communication is accomplished by propagating an RF plane wave through free space, near-field communication utilizes non-propagating quasi-static H and E fields.

Frequencies used for near-field communications are usually below 50 MHz while frequencies for far-field communication can in some examples range from 0.1 to 6 GHz or higher. A common near-field frequency is 10.6 MHz and a common far-field frequency is 2.5 GHz for various consumer devices. Near-field communication protocols may or may not be proprietary, while far-field communication protocols can include WLAN, Bluetooth, or others that have a desired communications range.

In near-field electromagnetic induction (NFEMI) wireless devices, communications transceivers use both magnetic (H) and electric (E) fields. An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance structures at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

Some wireless networked devices employ Near-Field Magnetic Induction (NFMI) as a wireless communication method. In NFMI wireless communication, two loosely coupled coils realize signal transfer. No radiation of radio waves takes place. A current flowing in the transmission coil generates a H-field which in turn induces a current in the receiving coil. In this way, wireless communication is accomplished. Unfortunately, H-field based NFMI systems with small antenna coils have a limited range that may be much smaller than an entire wearable user's body. Such H-field communications are sensitive to coil orientation. In the case of a hearing aid form factor, a H-field induction based system cannot cover an entire human body. However, since in hearing aids both coils are always aligned with each other, they are not influenced by the movement of the human body.

Other wireless networked devices employ Near-field Electric Induction (NFEI)) as a wireless communication method. NFEI allows electronic devices on and near a host structure (e.g. a human body) to exchange information through E-field coupling (e.g. at 21 MHz). NFEI is also sometimes called Body Coupled Communication (BCC). While E-field based NFEI signals can have a greater range than H-field based NFMI signals, the E-field signal strength can vary with regard to body posture and is sensitive to body movements. The body can even partially block a capacitive return path, thereby increasing E-field channel loss and reliable and robust wireless communication is not possible.

FIG. 1 is a first example idealized near-field electromagnetic induction (NFEMI) antenna 100. In this example embodiment, the antenna 100 includes a coil (H-field) antenna 105 for magnetic fields, in conjunction with a short loaded dipole (E-field) antenna 120 for electric fields. The H-field antenna 105 includes a ferrite core 110 wound with wire 115. The E-field antenna 120 includes two conductive loading structures 125 and 130. Antenna 100 feed points 135, 140 are coupled to various transceiver circuitry, such as downstream radio transmitter and receiver integrated circuit (RF-IC), (not shown here).

When the NFEMI antenna 100 is proximate to a structure (e.g. a host structure, a body, a person, an object, etc.) the magnetic and electric fields will be substantially confined to the structure and not significantly radiate in free-space. This enhances security and privacy of such body networked communications.

In various example embodiments, the antenna 100 operates at or below 50 MHz (e.g. for example at 30 MHz) to ensure that the fields are following the structure's contours and to ensure that far field radiation is strongly reduced.

Figure 2:
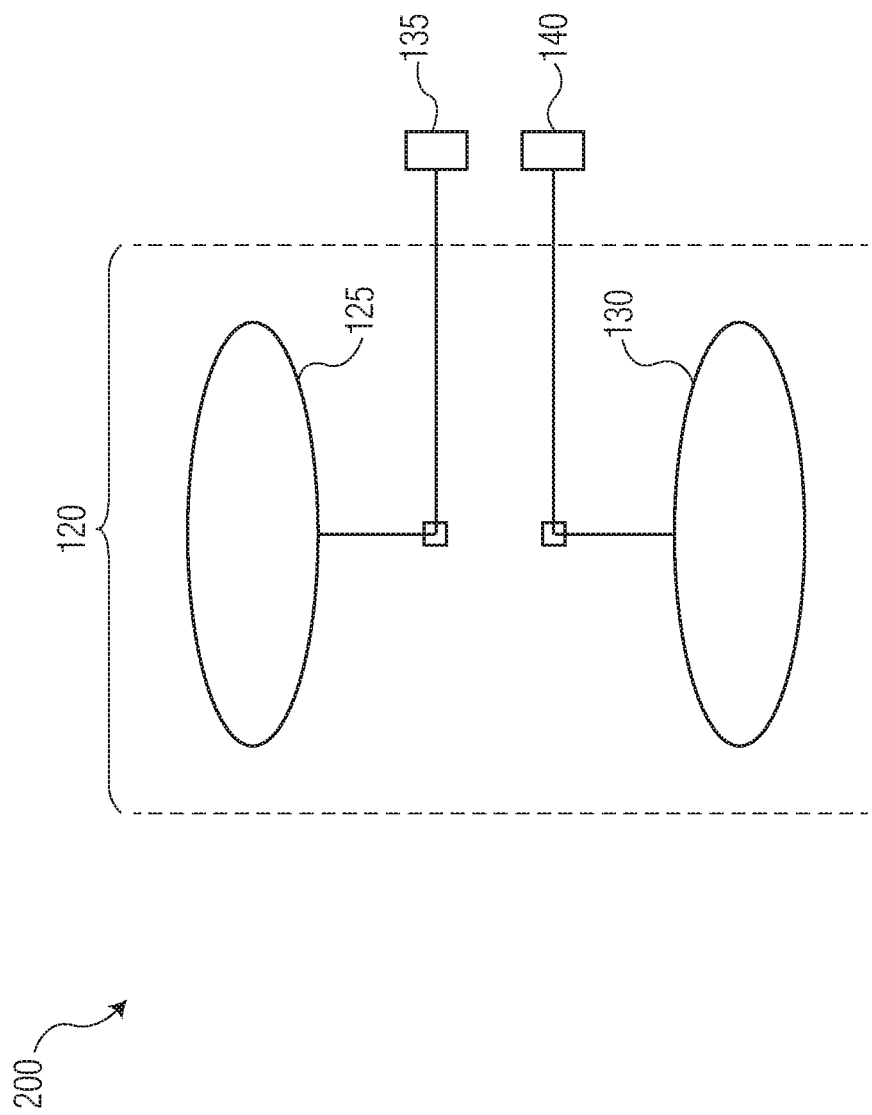
FIG. 2 is a second example idealized near-field electromagnetic induction (NFEMI) antenna.

FIG. 2 is an example idealized near-field electro induction (NFEI) antenna 200. In some example embodiments, the antenna 200 includes a short loaded dipole (E-field) antenna 120 for electric fields. The E-field antenna 120 includes two conductive loading structures 125 and 130. Antenna 200 feed points 135, 140 are coupled to various transceiver circuitry, such as downstream radio transmitter and receiver integrated circuit (RF-IC), (not shown here). In some example embodiments the transmit frequency is below 50 MHz to ensure that the near-fields are following the body contours and far field radiation is strongly reduced.

On-body NFEI communication, however, can be prone to electro-magnetic (EM) interference that occurs when unwanted radio frequency signals disrupt the near-field communications. Interference may prevent reception altogether, may cause only a temporary loss of a signal, or may affect the quality of the reception of the sound or data. The interference can come from a variety of sources, including nearby electric and electronic systems (e.g. light source regulation, household appliances, refrigerators, coffee machines, etc.).

For example, a human body acts as an antenna for some of these electro-magnetic interference signals because tissues composing the human body have a high dielectric constant under 80 MHz. Electromagnetic waves between 30 and 80 MHz have wavelengths comparable to a length of an entire human body all the way to various body parts, such as arms and legs.

Some applications of near-field antennas 100 and 200 however suffer communication signal degradation when a host structure is located proximate to a ground (e.g. a road, earth, soil, a floor, or other surfaces). In such less than optimal locations, such near-field antennas 100 and 200 can be degraded when in proximity or contact with the ground.

Wireless devices that also include far-field communications antennas for communicating with other wireless devices not connected to a host structure can suffer as well. For example, far-field antennas placed close to a ground can have a strongly reduced communication range due to decreased radiation resistance and loss in energy due to absorption by the ground.

Even further, a cost of fabricating the near-field antennas 100, 200 and related circuits can limit their applications to various host structures, perhaps due to a frequent need for replacement due to harsh conditions and/or normal operational practices.

Now discussed are example embodiments of near-field wireless devices that can be not only positioned close to grounds, but also coupled to sensors that might best collect data at a location close to a ground (e.g. a horse's hoof impacting a dirt floored arena, an industrial worker in a building, a robot's operation delivering packages, livestock health in a field, an assembly line machine contacting part in fabrication, a tracked-vehicle (e.g. tank) moving over a ground surface, etc.)

These example embodiments can include far-field wireless devices coupled to other far-field wireless devices for ensuring robust long-distance communications. Some example embodiments of these wireless devices also can be fabricated at a reduced cost, perhaps re-using existing host structure features (e.g. a horseshoe, a metal toed safety shoe, a robot's contact foot, part of a vehicle's track structure, etc.).

While the example embodiments discussed below are applied to a horse in an equestrian setting other example embodiment can apply to workers, robots, livestock, machines, etc. as introduced above.

Figure 3:
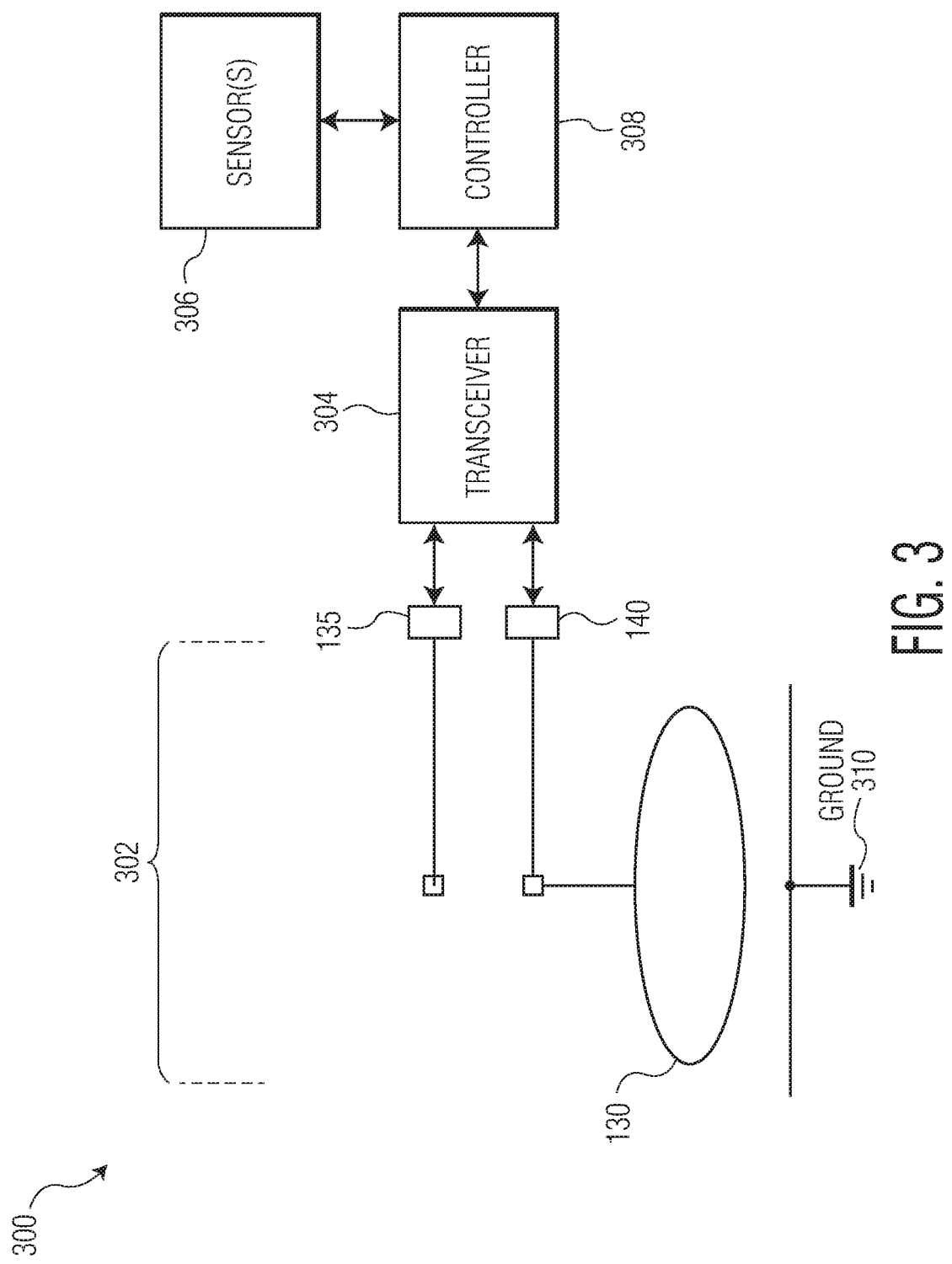
FIG. 3 is an example idealized wireless device.

FIG. 3 is an example 300 idealized wireless device. The example wireless device 300 includes a short loaded dipole (E-field) antenna 302 having a conductive surface 130, feed points 135, 140, a transceiver 304 (RF-IC), one or more sensor(s) 306 and a controller 308.

As will be discussed the conductive surface 130 is configured to come into repeated contact with a ground 310. While only a near-field electro-induction (NFEI) antenna 302 is shown, the magnetic coil antenna 105 shown in FIG. 1 could be added to create an NFEMI antenna.

The near-field transceiver 304 is configured to be coupled to a host structure (not shown) (e.g. horse, human, robot, machine, etc.). The controller 308 is coupled to the transceiver 304 and the sensor(s) 306.

The near-field transceiver's 304 feed point 140 is configured to be coupled to the conductive surface 130 (e.g. a horseshoe) which is itself capacitively coupled to the host structure to form part of the near-field electric antenna 302.

The conductive surface 130 is configured to be in repeated, but not continuous, (e.g. walking, running prancing, rotating, grasping, touching, stopping then standing, etc.) contact with (e.g. shorted to, pressed against, galvanically connected with etc.) the ground 310 (e.g. earth ground, an assembly line, soil, a road, a trail, or a floor, etc.). One or more of the sensors 306 can be configured to detect whether the conductive surface 130 is in contact with the ground 310 or not.

In example embodiments where the conductive surface 130 is a horseshoe, the horseshoe is the conductive surface 130 that is used for the electric antenna's capacitive plate. In such applications the horseshoe is quite robust and is not materially damaged by a force between the horse's hoof/horseshoe and the ground 310.

In other example embodiments the conductive surface 130 could be part of a metal safety shoe, a robotic contact foot, an assembly-line grasping device, and/or part of a vehicle's track structure. Thus in these various applications, the host structure can also be a person, a robot, livestock, an assembly line machine, or a vehicle track.

The wireless device 300 is configured to communicate with other wireless devices (not shown) when the conductive surface 130 is not in contact with the ground 310. This aids a better near-field signal transmission from the wireless device 300 to other wireless devices. Such operation would also aid wireless devices (not shown) that include far-field transceivers, even with such devices would also repeatedly contact the ground 310.

The wireless device 300 is configured to enter a low-power state (e.g. sleep mode, standby, etc.) when the conductive surface 130 of the wireless device 300 is in contact with the ground 310. (e.g. saves power)

In example embodiment with multiple wireless devices 300, those wireless devices 300 near the ground 310 may only have near-field transceivers that communicate with other near-field transceivers coupled to the host structure. However, one of those wireless devices 300 could also have a far-field transceiver that relays the other wireless devices' 300 near-field signals to another far-field wireless device not coupled to the host structure (see FIG. 5 for an example of this arrangement).

In such a multi-wireless device 300 arrangement the wireless device 300 with the far-field transceiver can be spatially positioned further from the ground 310 than the wireless devices 300 with the near-field transceivers and sensor(s) 306.

Some example embodiments further comprise an intermediate structure (e.g. pad) configured to be coupled between the conductive surface 130 (e.g. horseshoe) and the host structure. In these examples, the near-field transceiver 304 and the controller 308 can be physically coupled to the intermediate structure. The intermediate structure can be a disposable pad and/or a dielectric structure.

Figure 4:
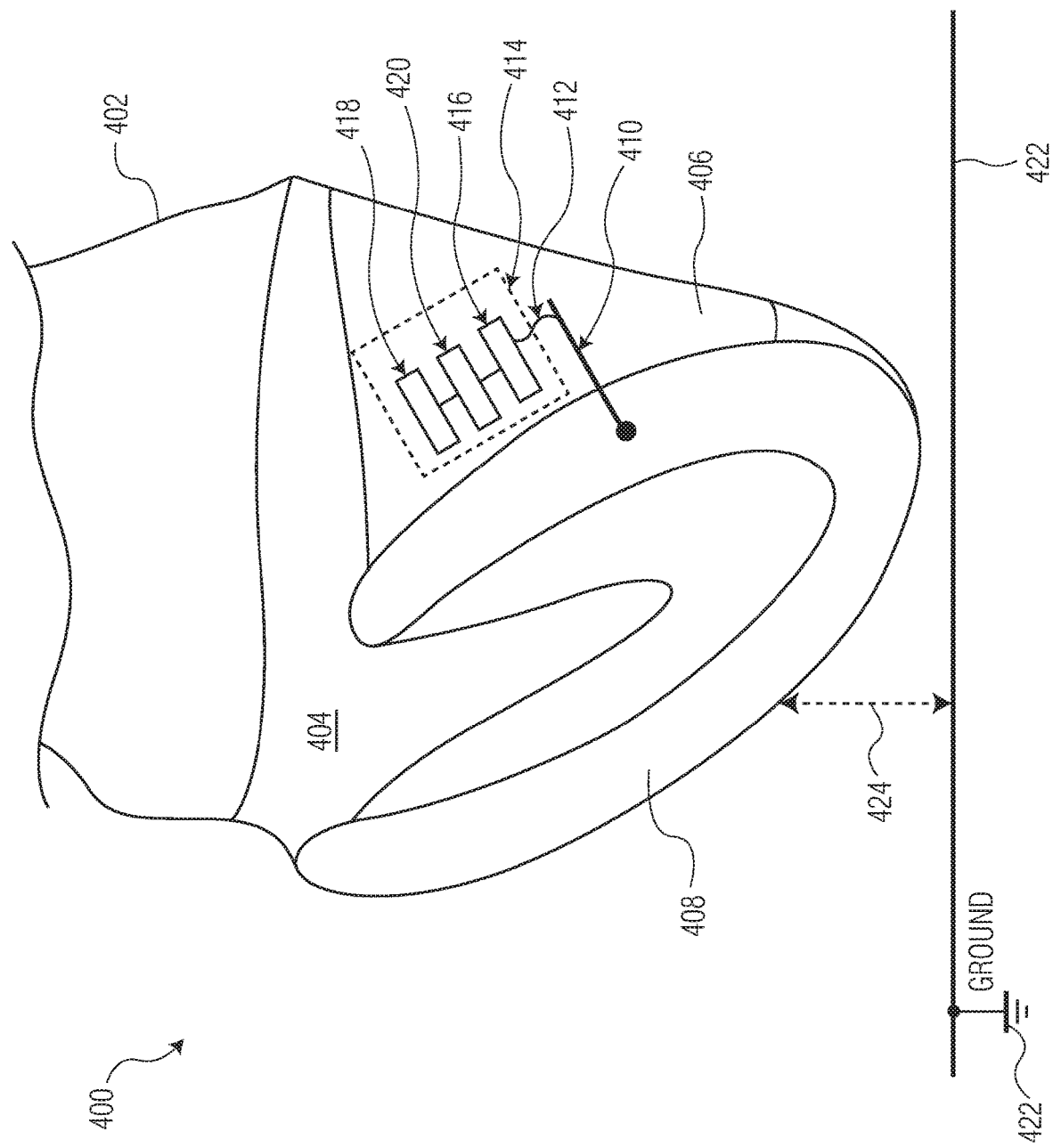
FIG. 4 is a first example application of the wireless device.

FIG. 4 is a first example 400 application of the wireless device 300. This first example 400 shows a host structure (e.g. a horse) having a leg 402 and a hoof 404, an intermediate structure 406 (e.g. dielectric structure, a pad, etc.), a conductive surface 408 (e.g. horseshoe), a conductive via 410 (e.g. a nail, a screw, or other attaching device), a galvanic coupling 412 (e.g. a wire), and a device module 414.

The device module 414 includes a near-field transceiver 416, one or more sensor(s) 418, and a controller 420. The device module 414 can be coupled to or embedded in the intermediate structure 406. In example embodiments where the intermediate structure 406 is a pad, the galvanic coupling 412 in the pad can include "conductive areas/spots" that enable the conductive via 410 (e.g. a nail) to couple the conductive surface 408 to the transceiver 416 when the horseshoe is nailed to the hoof 404.

As will be discussed the conductive surface 408 is configured to come into repeated contact with a ground 422. This repeated contact is abstractly represented by a physical movement path 424 of the horse's hoof touching the ground.

In this example 400 the host structure is a horse, the conductive surface 408 is a horseshoe, the horseshoe 408 is coupled to the hoof 404 with spikes 410. Thus the near-field electric antenna 302 consists of the horseshoe 408 which is a conductive material that is positioned close to skin and blood vessels of the horse but separated from the hoof 404 by a dielectric pad 406, creating a capacitive coupling to the horse. In example embodiments with a further magnetic coil (H-field) antenna 105, the magnetic antenna part can be a very low volume ferrite rod with windings or can be a planar coil.

The device module 414 is configured to communicate with other wireless devices when the conductive surface 408 (e.g. horseshoe) is not touching the ground 422 (e.g. earth), and to not communicate with other wireless devices when the conductive surface 408 (e.g. horseshoe) is touching the ground 422 (e.g. earth).

The device module 414 can time these transmissions if one of the sensors 418 is an accelerometer for example. The device module 414 would monitor the hoof's 404 movement using the accelerometer to determine when the horseshoe 408 is close to ground and power should be conserved since near-field and/or far-field propagation would be severely attenuated since the horseshoe would basically be shorting the conductive surface 408 (e.g. horseshoe) to the ground 310 and to transmit near-field or far-field signals only when hoof 404 is off or relatively far from the ground 422.

In equestrian applications, the wireless device 300 could be embedded in a disposable pad that would be replaced every six-to eight weeks as part of a normal re-shoeing process.

Figure 5:
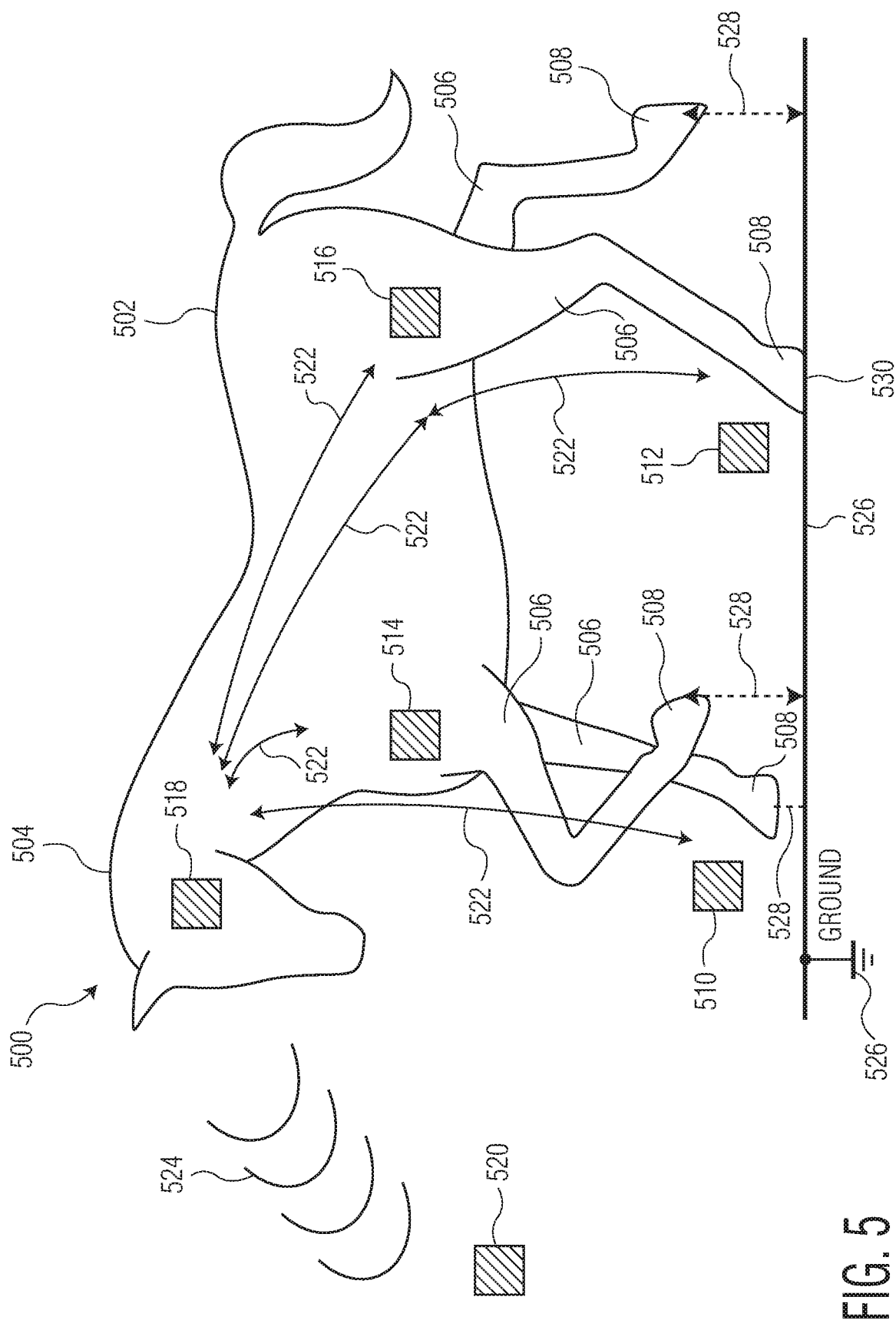
FIG. 5 is a second example application of a set of the wireless devices.

FIG. 5 is a second example 500 application of a set of the wireless devices 300. This second example 500 application of the set of the wireless devices 300 shows a host structure 502 (e.g. horse) having a head 504, legs 506, and hoofs 508. Attached to the horse 502 are the set of the wireless devices 300, including a first wireless device 510, a second wireless device 512, a third wireless device 514, a fourth wireless device 516, and a fifth wireless device 518. While some of the wireless devices 510, 512, 514, 516 may only have near-field transceivers, at least the fifth wireless device 518 includes both a near-field transceiver and a far-field transceiver.

The wireless devices 510, 512, 514, 516 communicate with the fifth wireless device 518 via a set of near-field communication links 522. The fifth wireless device 518 communicates with a sixth wireless device 520 not physically coupled to the horse 502 via a far-field communication link 524.

Similar to the FIG. 4 discussion conductive surfaces coupled to the hoofs 508 come into repeated contact with a ground 526. This repeated contact is abstractly represented by physical movement paths 528. Location 530 shows contact of one hoof 508 with the ground 526, while the other hoofs 508 are not yet in contact with the ground 526.

Thus is this example embodiment wireless devices with sensors are optimally integrated with the horse's 502 normal hardware (e.g. horseshoes) and are also located at each of the hoofs 508 to better collect data, and the far-field transceiver in the fifth wireless device 518 is optimally located at the head 504 of the horse 502 at a much higher location for a greatest far-field communication range and signal strength.

Figure 6:
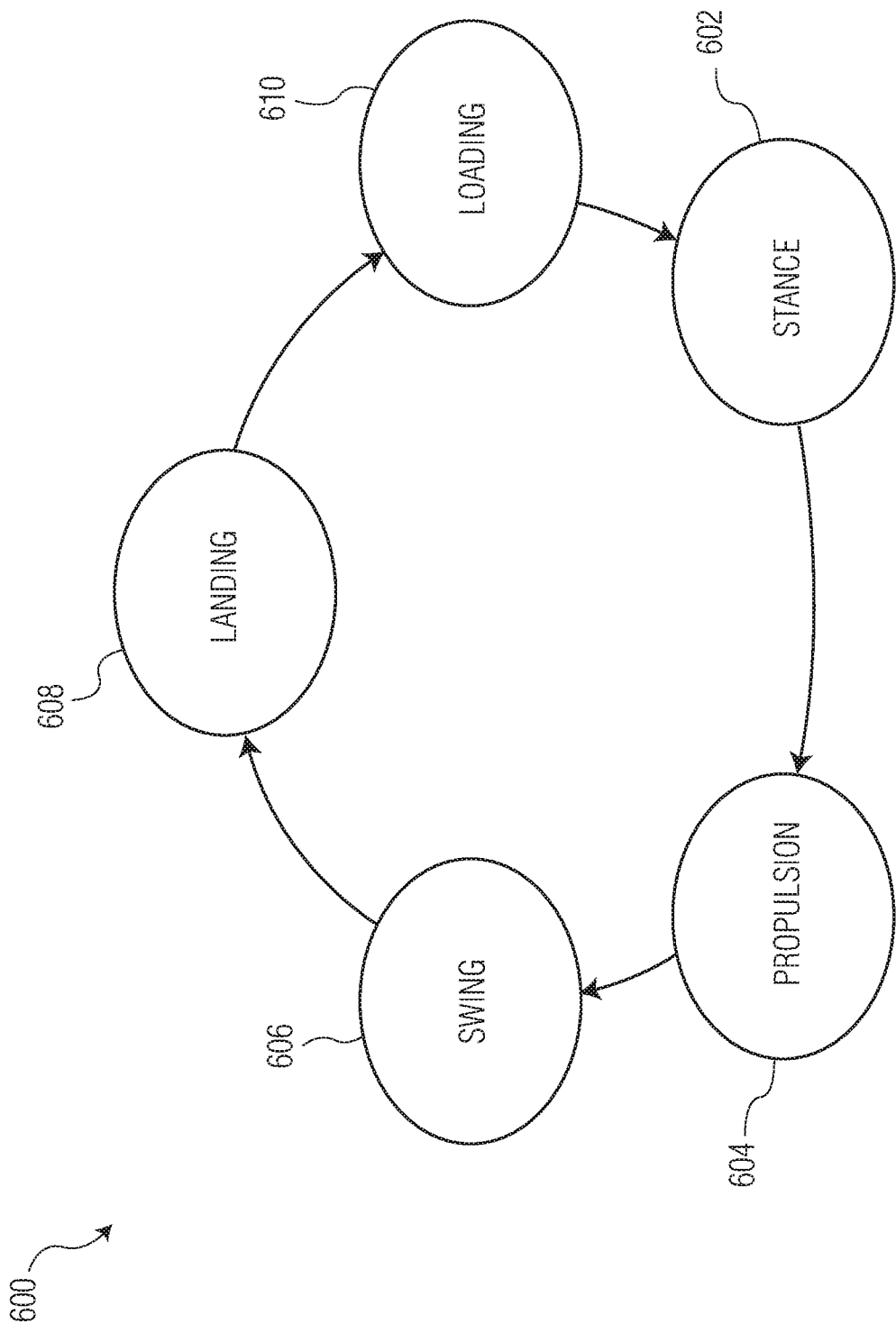
FIG. 6 is an example gate cycle for a horse.

FIG. 6 is an example 600 gate cycle for a horse. The gate cycle 600 shows the main phases of a horse's single hoof movement and function over time. The gate cycle 600 includes the following phases/states: stance 602, propulsion 604, swing 606, landing 608, and loading 610.

Figure 7:
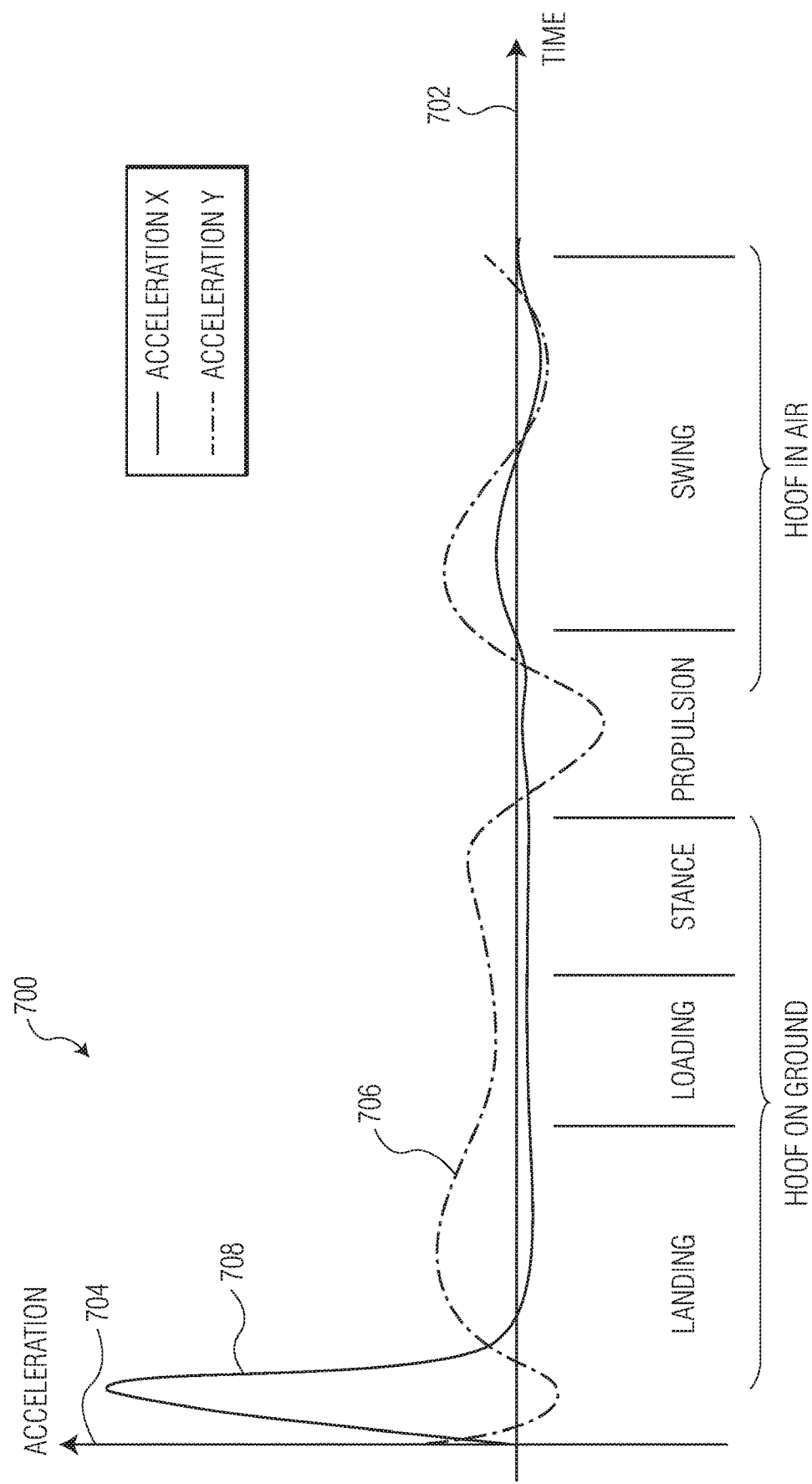
FIG. 7 is an example set of acceleration sensor data over time in both a horizontal (X) direction and a vertical (Y) direction.

FIG. 7 is an example 700 set of acceleration 704 sensor data over time 702 in both a horizontal (X) direction 706 and a vertical (Y) direction 708. Radio transmission is possible during the "swing" phase, between the end of the propulsion phase and the landing Human movement is quite similar.

While this example embodiment shows accelerometer data to detect contact with the ground 310, 422, 526 or other motions and/or physiological parameter, using sensors such as: an infra-red sensor, a temperature sensor, a proximity sensor, a pressure sensor, or a pressure plate.

Sensor data such as just described can have many applications for people, machines, animals, environment, and so on. Specifically for horses, such sensor data can support animal husbandry, health, behavior, and/or performance. Two wireless devices at the front hoofs of a horse could provide a proxy for the horse's medical health based on prancing movements, left right balance, scraping the ground, and so on. Four wireless devices at each hoof of a race-horse could provide information on the horse's gate, speed, crossing a finish line, and so on.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A wireless device, comprising:
   a near-field transceiver configured to be coupled to a host structure;
   a controller coupled to the transceiver;
   wherein the near-field transceiver includes a feed point configured to be coupled to a conductive surface;
   wherein the conductive surface is configured to be capacitively coupled to the host structure to form part of a near-field electric antenna; and
   wherein the conductive surface is configured to be in repeated, but not continuous, contact with a ground.

2. The device of claim 1:
   wherein the conductive surface is configured to be in repeated contact with the ground in response to the host structure walking, running prancing, rotating, grasping, touching, and/or stopping then standing.

3. The device of claim 1:
   wherein the ground is at least one of: earth ground, an assembly line, soil, a road, a trail, or a floor.

4. The device of claim 1:
   wherein the conductive surface is a horseshoe.

5. The device of claim 1:
   wherein the conductive surface is at least one of: a metal safety shoe, a robotic contact foot, a grasping device, and/or part of a vehicle's track structure.

6. The device of claim 1:
   wherein the feed point is coupled to the conductive surface with a conductive via.

7. The device of claim 6:
   wherein the conductive surface is a horseshoe; and
   wherein the conductive via is at least one of: a nail, a spike, a bolt, or a clamp.

8. The device of claim 1:
   wherein the host structure is a horse.

9. The device of claim 1:
   wherein the host structure is at least one of: a person, a robot, livestock, an assembly line machine, or a vehicle track.

10. The device of claim 1:
    wherein the wireless device is configured to communicate with another wireless device when the conductive surface is not in contact with the ground.

11. The device of claim 1:
    wherein the wireless device is configured to enter a low-power state when the conductive surface of the wireless device is in contact with the ground.

12. The device of claim 1:
    wherein the host structure is a horse;
    wherein the conductive surface is a horseshoe;
    wherein the horseshoe is coupled to a hoof of the horse;
    wherein the ground is earth;
    wherein the wireless device is configured to communicate with another wireless device when the hoof is not touching the earth; and
    wherein the wireless device is configured to not communicate with another wireless device when the hoof is touching the earth.

13. The device of claim 1:
    wherein the wireless device is a first wireless device;
    further comprising a second wireless device configured to be coupled to the host structure and having a near-field transceiver and a far-field transceiver;
    wherein the second wireless device is configured to receive a near-field electric signal from the near-field electric antenna of the first wireless device.

14. The device of claim 13:
    wherein the second wireless device is spatially further from the ground than the first wireless device.

15. The device of claim 1:
    further comprising an intermediate structure configured to be coupled between the conductive surface and the host structure; and
    wherein the near-field transceiver and the controller are physically coupled to the intermediate structure.

16. The device of claim 15:
    wherein the intermediate structure is a disposable pad.

17. The device of claim 16:
    wherein the intermediate structure is a dielectric structure.

18. The device of claim 1:
    further comprising a sensor coupled to the controller;
    wherein the sensor is configured to detect when the conductive surface is in contact with the ground.

19. The device of claim 18:
    wherein the sensor is configured to measure a physiological parameter of the host structure.

20. The device of claim 18:
    wherein the sensor is at least one of: an accelerometer, an infra-red proximity sensor, a pressure sensor, or a pressure plate.

21. The device of claim 1:
    further comprising a near-field magnetic antenna including a coil;
    wherein the coil is coupled to the near-field transceiver; and
    wherein together the coil and conductive surface function as a near-field electromagnetic induction (NFEMI) antenna.

22. A method of making a wireless device, comprising:
    selecting an intermediate structure, a horseshoe, and a nail or screw;
    wherein the intermediate structure includes a near-field transceiver coupled to a controller;
    coupling the near-field transceiver to the horseshoe with the nail or screw;
    wherein, upon coupling, the horseshoe is capacitively coupled to the horse to form a near-field electric antenna.

* * * * *